United States Patent
Bendel

(10) Patent No.: US 12,173,534 B2
(45) Date of Patent: Dec. 24, 2024

(54) MOTOR VEHICLE PANEL, IN PARTICULAR MOTOR VEHICLE DOOR

(71) Applicant: Kiekert AG, Heiligenhaus (DE)

(72) Inventor: Thorsten Bendel, Oberhausen (DE)

(73) Assignee: Kiekert AG, Heiligenhaus (DE)

( * ) Notice: Subject to any disclaimer, the term of this patent is extended or adjusted under 35 U.S.C. 154(b) by 28 days.

(21) Appl. No.: 17/996,518

(22) PCT Filed: Feb. 16, 2021

(86) PCT No.: PCT/DE2021/100150
§ 371 (c)(1),
(2) Date: Oct. 19, 2022

(87) PCT Pub. No.: WO2021/213565
PCT Pub. Date: Oct. 28, 2021

(65) Prior Publication Data
US 2023/0211724 A1    Jul. 6, 2023

(30) Foreign Application Priority Data
Apr. 21, 2020    (DE) ............... 10 2020 110 797.8
Apr. 21, 2020    (DE) ............... 10 2020 110 812.5

(51) Int. Cl.
E05B 81/82    (2014.01)
B60Q 1/32     (2006.01)
E05B 17/10    (2006.01)
E05B 81/04    (2014.01)
B60R 16/033   (2006.01)
E05F 15/611   (2015.01)

(52) U.S. Cl.
CPC ............. *E05B 81/82* (2013.01); *B60Q 1/324* (2022.05); *E05B 17/10* (2013.01); *E05B 81/04* (2013.01); *B60R 16/033* (2013.01); *E05F 15/611* (2015.01)

(58) Field of Classification Search
CPC ................. E05B 81/82; E05B 17/10
See application file for complete search history.

(56) References Cited

U.S. PATENT DOCUMENTS 5,121,098 A * 6/1992 Chen ................... B60Q 1/2696
                                                    340/321
5,547,208 A * 8/1996 Chappell ................ H02J 9/061
                                                    180/281
10,480,221 B2 * 11/2019 Cumbo ................ E05C 17/006
(Continued)

FOREIGN PATENT DOCUMENTS

DE    102006002119 A1    7/2006
DE    102015003918 A1    9/2016
(Continued)

OTHER PUBLICATIONS

International Search Report mailed Jul. 29, 2021, for priority International Patent Application No. PCT/DE2021/100150.

*Primary Examiner* — Marcus Menezes
(74) *Attorney, Agent, or Firm* — Renner, Otto, Boisselle & Sklar, LLP

(57) ABSTRACT

A motor vehicle panel, in particular motor vehicle door which comprises a lighting unit and an energy accumulator unit arranged in the door leaf for supplying energy to at least the lighting unit. According to the invention, the energy accumulator unit is coupled to the lighting unit via at least one detachable electric connection.

15 Claims, 2 Drawing Sheets

(56) References Cited

U.S. PATENT DOCUMENTS

| | | | | |
|---|---|---|---|---|
| 2012/0192602 A1* | 8/2012 | Bacon | .................. | E05B 47/026 |
| | | | | 70/278.1 |
| 2016/0340940 A1* | 11/2016 | Krishnan | ................ | E05B 17/22 |
| 2018/0072225 A1* | 3/2018 | Chen | ...................... | B60Q 9/008 |
| 2020/0039429 A1* | 2/2020 | Berkowitz | ........... | B60Q 1/2615 |

FOREIGN PATENT DOCUMENTS

| | | |
|---|---|---|
| DE | 102016105987 A1 | 10/2017 |
| DE | 102009006948 B4 | 2/2018 |
| DE | 102018117477 A1 | 1/2019 |
| DE | 102018129403 A1 | 5/2019 |
| DE | 102018124331 A1 | 4/2020 |
| EP | 1039077 A2 | 9/2000 |
| FR | 2860823 A1 | 4/2005 |
| JP | 10678080 U | 11/1994 |
| JP | 2006062545 A | 3/2006 |

\* cited by examiner

MOTOR VEHICLE PANEL, IN PARTICULAR MOTOR VEHICLE DOOR

This application is a national phase of International Patent Application No. PCT/DE2021/100150 filed Feb. 16, 2021, which claims priority to German Patent Application No. 10 2020 110 797.8 filed Apr. 21, 2020, and German Patent Application No. 10 2020 110 812.5, filed Apr. 21, 2020, each of which is hereby incorporated herein by reference in its entirety.

FIELD OF DISCLOSURE

The invention relates to a motor vehicle panel, in particular motor vehicle door which comprises a lighting unit and an energy accumulator unit arranged in the door leaf for supplying energy to at least the lighting unit.

BACKGROUND OF DISCLOSURE

Lighting units in motor vehicle panels and in particular motor vehicle doors are used in particular to increase safety. With the help of the lighting unit, for example, a pedestrian or cyclist can be visually informed of the process when a motor vehicle panel is opening. This increases safety and, in particular, allows collisions to be avoided. A motor vehicle panel is any device that can be moved relative to a body and closes an opening in or on the body.

For example, the motor vehicle panel is a motor vehicle tailgate, a motor vehicle front hood, a motor vehicle loading flap, a motor vehicle tank flap, etc. In particular, the invention relates to motor vehicle doors and here mostly motor vehicle side doors.

In the generic prior art according to DE 10 2016 105 987 A1, a locking device for a motor vehicle is described, which has a light source and an additional light-conducting element. In this way, light can be guided and emitted in the surroundings of the locking device. In addition, the light-conducting element has an imaging means. As a result, a variable display can be generated overall. In addition, the display can be projected, so that at least one character and/or one symbol and/or one pattern can be displayed.

In this way, display states can be reproduced via the representation of characters or symbols. As a result, for example, the user of a motor vehicle is clearly informed of a defective locking state of the motor vehicle. Warnings can also be projected as a result. This has proven itself in principle. However, the lighting unit is typically supplied with energy conventionally via an integrated battery which is permanently installed in a locking device housing.

In addition to such lighting units on or in motor vehicle panels, there are also additional devices that can be supplied with the required energy, at least in an emergency, by an energy accumulator unit arranged in the door leaf. In the context of DE 10 2018 129 403 A1, these additional devices are, for example, a driven door presenter system. With their help or an associated presenter actuator, the door leaf can be set up at least far enough in relation to the vehicle body that the motor vehicle panel in question can then be opened and pivoted manually without any problems. This also works if there is no outside door handle at all.

Quite apart from that, DE 10 2018 117 477 A1 describes a closure panel system for a motor vehicle. In addition to a presenter arrangement, this also has a lighting arrangement or a lighting unit that is installed in the vicinity of a gripping region and can be operated. The energy is obviously supplied conventionally using an energy source that is already present in the motor vehicle.

The state of the art has basically proven itself as far as the operation of the lighting unit or the locking device or a door presenter device is concerned. However, all of the aforementioned devices and their proper functioning are dependent on an uninterrupted electrical energy supply. DE 10 2018 129 403 A1 describes the basic possibility of supplying the powered presenter system there with electrical energy using a backup energy source in an emergency. This applies in particular when a connection to the main supply source, usually the vehicle battery, is interrupted or fails for other reasons.

However, this is a solution that relies on an energy accumulator unit permanently installed inside the motor vehicle panel for supplying energy, in particular in an emergency. This has the disadvantage that the energy accumulator unit in question cannot simply be replaced after a certain period of operation, for example. In addition, there is no possibility of also being able to couple other adjusting or locking elements provided in or on the motor vehicle panel with the energy accumulator unit provided. The invention as a whole seeks to remedy this.

SUMMARY OF DISCLOSURE

The invention is based on the technical problem of further developing such a motor vehicle panel and in particular a motor vehicle door in such a way that the energy accumulator unit can be replaced and, under certain circumstances, is also used to supply other elements.

To solve this technical problem, a generic motor vehicle panel and in particular a motor vehicle door is characterized within the scope of the invention in that the energy accumulator unit is coupled to the lighting unit via at least one detachable electrical connection.

Within the scope of the invention, the energy accumulator unit inside the door leaf is designed to be exchangeable. This is ensured by the detachable electrical connection. In addition to the detachable electrical connection to the lighting unit, further electrical connections can be implemented starting from the energy accumulator unit. In fact, as part of an advantageous embodiment, an electrically actuable actuating and/or locking element for the door leaf is generally provided in addition to the lighting unit. Alternatively or additionally, the actuating and/or locking element can also be implemented for a further panel component that can be moved relative to the door leaf. The actuating and/or locking element in question is also detachably connected to the energy accumulator unit. In addition, the actuating and/or locking element is usually likewise—like the energy accumulator unit—arranged inside the door leaf, so that the electrical connection can be implemented without problems and in a protected manner.

According to the invention, the energy accumulator unit arranged in the door leaf assumes a central function, so to speak, for the energy supply. This is because the energy accumulator unit in question has at least one, usually a plurality of, electrically detachable connections. First of all, the obligatory lighting unit is detachably coupled to the energy accumulator unit. In addition, the electrically actuable actuating and/or locking element can also draw its electrical energy from the energy accumulator unit via the further detachable electrical connection, in particular in an emergency.

The actuating and/or locking element for the door leaf can generally be a door opener, as is described, for example, in DE 10 2015 003 918 A1 by the applicant.

Alternatively or additionally, the actuating and/or locking element can also be designed as a door drive, which acts on a door hinge or is integrated into such a door hinge. An example of this is described in the applicant's DE 10 2009 006 948 B4.

In principle, the actuating and/or locking element for the door leaf can also be a motor vehicle latch or, in general, a locking system for the associated door leaf, as is described in DE 10 2006 002 119 A1. If the actuating and/or locking element works on a further panel component that can be moved relative to the door leaf, it is conceivable that a window lifter drive, a mirror drive, etc., falls under this at this point. Accordingly, the movable and additional panel component in the first-mentioned variant is a window pane that can be acted upon with the help of the window lifter drive. In contrast, the second variant provides a mirror which is acted upon by a mirror drive as an electrically actuable actuating and/or locking element.

In any case, it is clear that the energy accumulator unit designed to be exchangeable according to the invention can not only be coupled to the lighting unit via one or more detachable electrical connections but is also provided for supplying energy to other actuating and/or locking elements. This applies in particular to emergency operation. In fact, with the help of the energy accumulator unit, an electrically actuable motor vehicle door latch as a locking element can be supplied with the required electrical energy in order to realize and implement at least one door opening. Alternatively or additionally, the energy accumulator unit can also be used as an actuating element for the emergency supply of a door opener. This is particularly advantageous if the motor vehicle panel or door in question does not have an outside door handle and in emergency operation the associated door leaf must be opened at least far enough with the help of the door opener that a gap for opening the motor vehicle panel or motor vehicle door is opened manually. In general, this can also be realized and implemented with the help of a drive as an actuating element for the motor vehicle panel.

According to an advantageous embodiment, the energy accumulator unit and/or the lighting unit are constructed individually or together in a modular manner. In other words, the energy accumulator unit and/or the lighting unit each represent an independent and closed functional unit. As a rule, the energy accumulator unit and possibly the lighting unit together define a module. In addition, this is advantageously designed for retrofitting in a housing.

In general, both the energy accumulator unit and the lighting unit are designed for retrofitting in such a housing. The housing is one of the actuating and/or locking element. It is particularly advantageous if the energy accumulator unit and possibly the lighting unit together define a module for retrofitting in the housing. The housing is usually a housing of the locking element. The housing is preferably designed as a motor vehicle latch housing.

In other words, within the scope of the invention, the motor vehicle latch housing is additionally advantageously equipped with the replaceable module made up of the energy accumulator unit and possibly the lighting unit. As a result, the energy accumulator unit can be retrofitted or replaced if necessary. In addition, the energy accumulator unit in the example can be used not only for emergency actuation or emergency opening of the associated motor vehicle latch. With the help of the energy accumulator unit, it is also possible to act on the door opener and/or an opening drive. As a result, the energy accumulator unit takes over the already described central energy supply in emergency operation.

The lighting unit has at least one LED. Usually three or more LEDs are provided. The LEDs can also be designed in different colors. This makes it possible to implement different directions or purposes with the help of the lighting unit. For example, an LED directed backward, i.e., toward the rear of the vehicle, may light up red as a warning. With their help, for example, a pedestrian or cyclist driving behind is informed of the open door.

Another LED can, for example, be made to glow white and shine downward in order to illuminate a pivoting range of the motor vehicle door in question in the example. In addition, with the help of the third LED, there is still the possibility of illuminating the interior. In any case, this allows the motor vehicle latch to be equipped with additional functions in the example.

The energy accumulator unit as such usually contains at least one battery. Alternatively or additionally, the energy accumulator unit can also be equipped with one or more capacitors. The one or more capacitors are advantageously so-called supercaps, i.e., capacitors with a particularly high capacitance. The energy accumulator unit is supplied with electrical energy during operation by the motor vehicle battery or alternator without any problems, because the motor vehicle latch housing accommodating the module or the devices provided inside at this point are already electrically connected to the vehicle electrical system.

As a result, a motor vehicle panel and, in particular, a motor vehicle door is provided, which is first of all equipped with an additional lighting unit in order to be able to take over warning functions or also comfort functions as described. In addition, an energy accumulator unit is implemented, with the help of which not only the lighting unit can be supplied with the required electrical energy, but also other electrically actuable actuating and/or locking elements. This is particularly relevant for emergency operation because the energy accumulator unit in question takes on the function of a central emergency energy source.

All of this is achieved in a particularly simple manner and with the least amount of constructive effort in that possibly the lighting unit and the energy accumulator unit together represent a module for retrofitting in the housing of the actuating and/or locking element. Since the energy accumulator unit is also equipped with at least one detachable electrical connection to the lighting unit or the one or more actuating and/or locking elements, the energy accumulator unit can be easily replaced if necessary. Herein lie the substantial advantages.

BRIEF DESCRIPTION OF DRAWINGS

The invention is explained in greater detail below with reference to drawings which show only one exemplary embodiment. In the drawings.

DETAILED DESCRIPTION

Figure 1:
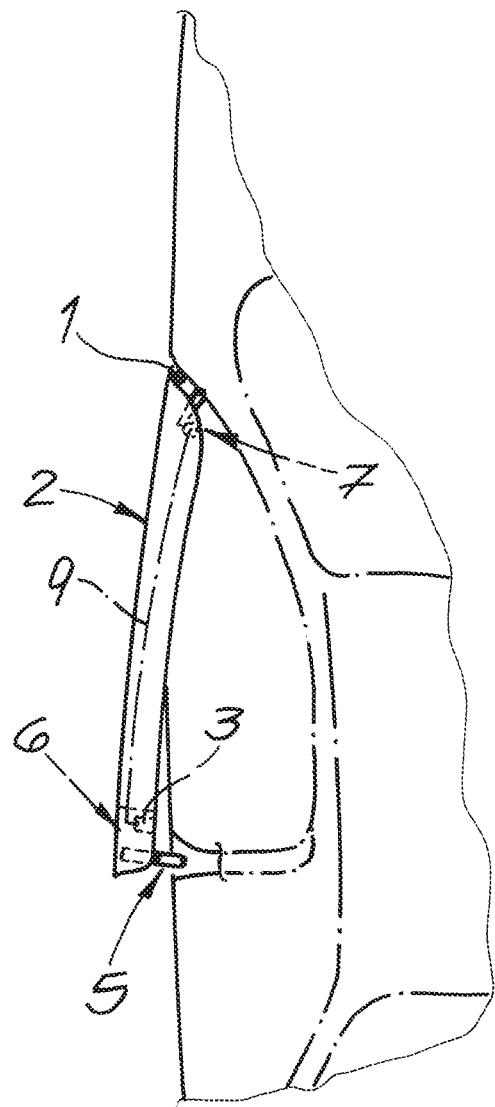
FIG. 1 is a schematic overview of the motor vehicle panel according to the invention in the form of a motor vehicle door and in particular a motor vehicle side door.

In the figures, a motor vehicle panel is shown, which, according to the exemplary embodiment, is a motor vehicle door and, specifically, according to the illustration in FIG. 1, is a front motor vehicle side door which is equipped with a door leaf 2 that can be pivoted about an axis 1.

The motor vehicle side door or the door leaf 2 is equipped with an energy accumulator unit 3 arranged in its interior. In addition, a lighting unit 4 is provided with three differently colored LEDs 4a, 4b, 4c according to the exemplary embodiment. In addition, an adjusting element 5 can be seen in FIG. 2.

The lighting unit 4, the energy accumulator unit 3, and the adjusting element 5 or, in general, the electrically actuable actuating element 5 for the door leaf 2 are accommodated in a housing 6 as a whole. The actuating element 5 can of course also be designed separately from the housing 6. However, this is not shown in detail. In the context of the exemplary embodiment, the housing 6 is a motor vehicle latch housing 6, i.e. a housing 6 which, in addition to the lighting unit 4, the energy accumulator unit 3, and the adjusting element 5, also has conventional latch elements such as a locking mechanism consisting of a catch and a pawl and an actuation/locking lever chain. However, this is not shown in detail.

In addition to the adjusting element 5 as an actuating and/or locking element 5, a drive 7 for the door leaf 2 is also provided. The drive 7 again represents an actuating element 7. The motor vehicle latch housing 6 or the associated motor vehicle latch is a locking element 6. The drive 7 is located in the region of a door hinge that defines the axis 1 and overall ensures that the door leaf 2 can be opened and closed.

Figure 2:
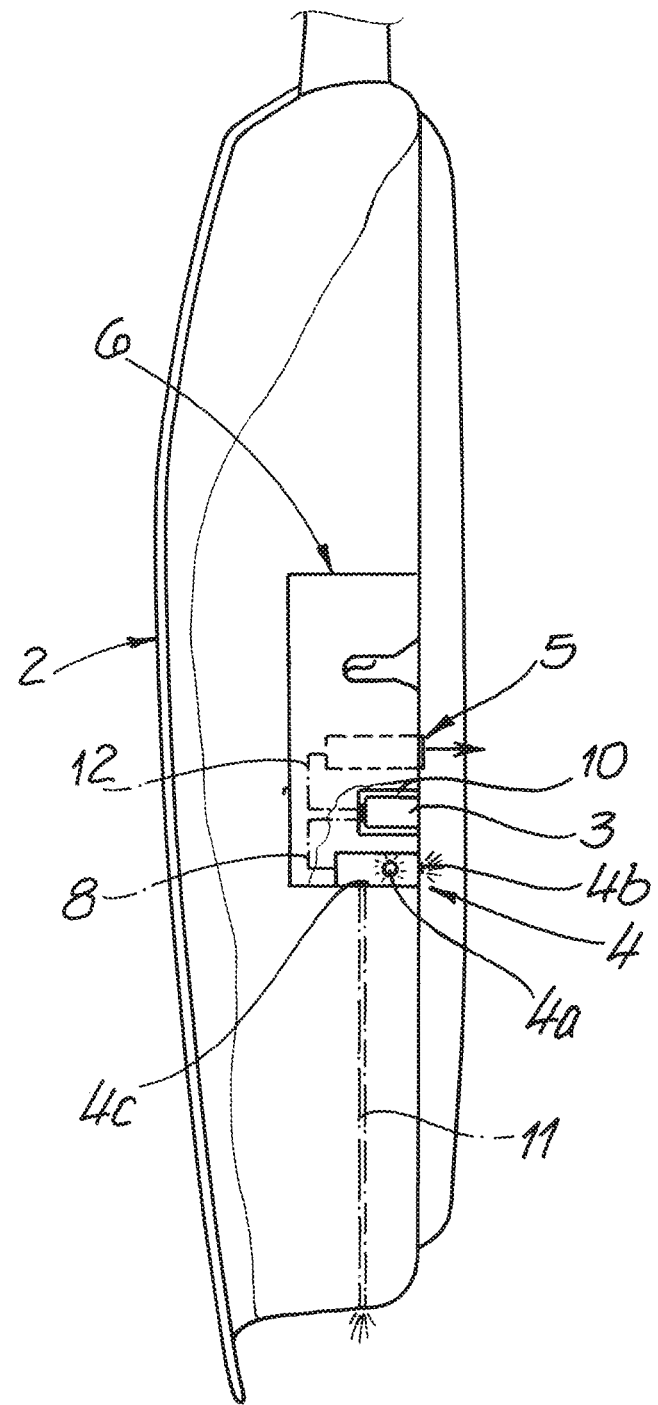
FIG. 2 is a detailed view of the motor vehicle side door.

A comparison of FIGS. 1 and 2 makes it clear that, according to the invention, the energy accumulator unit 3 is coupled to the lighting unit 4 via at least one detachable electrical connection 8, 9, 12. In fact, one can see in particular from the representation in FIG. 2 that three electrical connections 8, 9, 12 are detachably connected to the energy accumulator unit 3 according to the exemplary embodiment. One electrical connection 8 serves to couple the energy accumulator unit 3 to the lighting unit 4. In contrast, the other electrical connection 9 provides a detachable electrical connection from the energy accumulator unit 3 to the drive 7 for the door leaf 2. The additional, third electrical connection 12 detachably couples the energy accumulator unit 3 to the adjusting element 5.

In this way, the energy accumulator unit 3 assumes a central function for the energy supply and in particular for the emergency energy supply, namely in the event that the motor vehicle latch housing 6 shown is not (or no longer) electrically connected to the motor vehicle body because the electrical connection is interrupted or damaged due to an accident. Such an emergency operation is also possible when the vehicle battery is simply discharged and the door leaf 2 cannot otherwise be opened.

The energy accumulator unit 3 generally has at least one battery and/or one capacitor, as has already been described in the introduction. In addition, the design is usually such that the energy accumulator unit 3 and also the lighting unit 4 are constructed individually or together in a modular manner. In most cases, the design is such that the energy accumulator unit 3 and optionally the lighting unit 4 together define a module for retrofitting in the housing 6. According to the exemplary embodiment, only the energy accumulator unit 3 is designed as a module for retrofitting in the housing 6 in question. In other words, the energy accumulator unit 3 defines a closed functional module with its own housing for retrofitting in the housing 6.

For this purpose, the housing 6 or motor vehicle latch housing 6 according to the exemplary embodiment has a receptacle 10 in the housing 6 into which the energy accumulator unit 3 is detachably inserted. As soon as the energy accumulator unit 3 is plugged into the housing 6, mutually interacting contacts ensure that the lighting unit 4 is supplied with the required energy using the energy accumulator unit 3, because the electrical connection 8 is then closed. At the same time, the energy accumulator unit 3 represents an emergency energy source for an electric motor drive (not expressly shown) provided inside the housing or latch housing 6, with the aid of which the locking mechanism is typically opened by an electric motor. If the main energy source provided in the motor vehicle body fails, the energy accumulator unit 3 ensures that the motor vehicle latch can still be opened by an electric motor.

At the same time, the energy accumulator unit 3 or the module implemented at this point is equipped with electrical contact elements for retrofitting in the housing 6, so that the drive 7 for the door leaf 2 can also be acted upon by means of the energy accumulator unit 3 via the further detachable electrical connection 9 in the sense of an emergency opening.

As already explained, the lighting unit 4 is arranged inside the motor vehicle latch housing 6. For this purpose, the lighting unit 4 may be mounted on a circuit board or an electronic component carrier provided there anyway. In this case, the LED 4a ensures that the red light it emits is emitted backward in the example, i.e., in the opposite direction to the direction of travel in a rear region starting from the door leaf 2. As a result, the LED 4a in question assumes a warning function. In contrast, the further LED 4b is in the form of a white-light LED and may emit the light it emits in the direction of an interior of the associated motor vehicle. Finally, the third LED 4c provided, in conjunction with an indicated light-conducting element 11, ensures that the white light it emits is emitted in a pivoting range of the door leaf 2, i.e., in the direction of a ground. As a result, a vehicle user can see immediately whether or not, for example, he steps into a puddle when getting out.

The illustration in FIG. 2 shows that the energy accumulator unit 3 is not only equipped with a detachable electrical connection 8 to the lighting unit 4 and a further detachable electrical connection 9 to the drive 7 for the door leaf 2. Instead, according to the exemplary embodiment, the further third detachable electrical connection 12 is implemented, with the help of which the energy accumulator unit 3 ensures that the adjusting element 5 can also be supplied with the required electrical energy by the central energy accumulator unit 3 in emergency operation. The energy accumulator unit 3 is supplied overall with the required electrical energy by the main energy source inside the motor vehicle body. For this purpose, the motor vehicle latch or the motor vehicle latch housing 6 is coupled to the main energy source via an electrical connection (not expressly shown). The same applies to the adjusting element 5 and also the drive or actuator 7.

If the main energy source fails, the energy accumulator unit 3 first ensures that the locking mechanism inside the motor vehicle latch housing 6 is opened with the aid of the electric motor drive located there. The adjusting element 5 then uses the energy provided by the energy accumulator unit 3 in emergency operation to ensure that the door leaf 2 is adjusted at least far enough in relation to the motor vehicle body that a user or rescue personnel can use the gap that forms between the door leaf 2 and the motor vehicle body to fully open the door leaf 2 manually.

Alternatively or additionally, after the motor vehicle latch has been opened by an electric motor, the door leaf 2 can also be acted upon at least to the extent that the door leaf 2 is then opened completely manually with the aid of the drive 7 using energy from the energy accumulator unit 3. Basically, of course, a complete opening of the door leaf 2 in emergency operation with the help of the drive 7 is possible and conceivable.

LIST OF REFERENCE SIGNS

1 Axis
2 Door leaf
3 Energy accumulator unit
4 Lighting unit
5 Adjusting element/actuating element
6 Latch housing/locking element
7 Drive/actuating element
8, 9, 12 Electrical connection
10 Receptacle
11 Light-conducting element

The invention claimed is:

1. A motor vehicle panel comprising:
a door leaf, wherein the door leaf includes a housing having a first electrical connection that is connected to a vehicle electrical system, and wherein the housing further includes a second electrical connection that is connected to the first electrical connection to provide electrical power to one or more components in the housing,
a lighting unit, and
an energy accumulator unit arranged in the door leaf for supplying energy to the lighting unit,
wherein the energy accumulator unit is coupled to the lighting unit via at least one detachable electrical connection,
wherein the energy accumulator unit further is detachably electrically connected to at least one other electrical component in addition to the lighting unit,
wherein the energy accumulator unit comprises at least one energy source and a housing configured as a detachable module configured for detachable connection to the at least one detachable electrical connection,
wherein the energy accumulator unit is detachably attached to the second electrical connection in the housing of the door leaf to receive power from the vehicle electrical system,
wherein attachment of the energy accumulator unit to the second electrical connection closes the at least one detachable electrical connection to provide energy to the lighting unit, and
wherein the lighting unit is electrically separated from the vehicle electrical system when the energy accumulator is detached from the second electrical connection.

2. The motor vehicle panel according to claim 1, wherein the at least one other electrical component comprises at least one actuating element or locking element of the door leaf, and the energy accumulator unit is detachably electrically connected to the at least one actuating element or locking element.

3. The motor vehicle panel according to claim 1, wherein the energy accumulator unit and the lighting unit are separate components each being a detachable module with a corresponding housing.

4. The motor vehicle panel according to claim 1, wherein the energy accumulator unit and the lighting unit are configured to be retrofitted in a housing of at least one actuating element or locking element.

5. The motor vehicle panel according to claim 1, wherein the detachable module further includes the lighting unit, wherein the detachable module is configured for retrofitting in the door leaf.

6. The motor vehicle panel according to claim 5, wherein the detachable module is configured for retrofitting in a motor vehicle latch housing that houses a locking element.

7. The motor vehicle panel according to claim 1, wherein the lighting unit has at least one light-emitting diode (LED).

8. The motor vehicle panel according to claim 7, wherein the lighting unit has three or more LEDs.

9. The motor vehicle panel according to claim 8, wherein the LEDs are of different colors.

10. The motor vehicle panel according to claim 1, wherein the energy accumulator unit has at least one of a battery and a capacitor.

11. The motor vehicle panel according to claim 2, further comprising a further panel component that is movable relative to the door leaf, and the at least one actuating element or locking element is further configured to act on the further panel component to move the further panel component relative to the door leaf.

12. The motor vehicle panel according to claim 2, wherein the at least one actuating element or locking element is located inside the door leaf.

13. The motor vehicle panel according to claim 2, wherein the at least one actuating element or locking element includes a door drive that acts on a door hinge for acting on the door leaf.

14. The motor vehicle panel according to claim 2, wherein the at least one actuating element or locking element includes a motor vehicle latch of a locking system for the door leaf.

15. The motor vehicle panel according to claim 8, wherein at least two of the LEDS are positioned to emit light in different directions.

* * * * *